US008081342B2

(12) United States Patent
Kawamura

(10) Patent No.: US 8,081,342 B2
(45) Date of Patent: Dec. 20, 2011

(54) INFORMATION PROCESSING APPARATUS, INFORMATION PROCESSING METHOD, AND PRINT CONTROL PROGRAM

(75) Inventor: Nobuhiro Kawamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1319 days.

(21) Appl. No.: 11/457,249

(22) Filed: Jul. 13, 2006

(65) Prior Publication Data

US 2007/0024874 A1 Feb. 1, 2007

(30) Foreign Application Priority Data

Jul. 28, 2005 (JP) .................. 2005-218726

(51) Int. Cl.
*G06K 15/02* (2006.01)
*G06K 15/00* (2006.01)
*G06F 3/12* (2006.01)
*H04N 1/32* (2006.01)
*G03B 27/00* (2006.01)

(52) U.S. Cl. ....... 358/1.2; 358/1.13; 358/1.18; 358/448; 358/474; 355/404

(58) Field of Classification Search ............ 358/1.2, 358/1.13, 1.18, 448, 451, 452, 474; 399/85, 399/86, 182, 183, 374; 355/404; 400/61, 400/70, 76

See application file for complete search history.

(56) References Cited

U.S. PATENT DOCUMENTS

| 2003/0234832 A1* | 12/2003 | Uchida | 347/36 |
| 2004/0239959 A1* | 12/2004 | Yada et al. | 358/1.2 |
| 2005/0099644 A1* | 5/2005 | Nomoto et al. | 358/1.12 |
| 2005/0225779 A1* | 10/2005 | Kubota | 358/1.2 |

FOREIGN PATENT DOCUMENTS

JP 2001-026148 A 1/2001

* cited by examiner

*Primary Examiner* — Thomas Lett

(57) ABSTRACT

An information processing apparatus that can operate under the control of an operating system configured to allow changing an enlargement rate in units of job and can generate print data corresponding to a plurality of pages to be printed by a printing apparatus. A setting input unit inputs borderless print settings for performing a borderless printing and bordered print settings for performing a bordered printing applied to a predetermined page. An enlargement designation unit instructs an enlargement rate to the operating system, a decision unit determines whether a page to be processed is the predetermined page, a margin creation unit forms a margin in a peripheral region of the data enlarged by the operating system, and, a print data generation unit generates print data corresponding to a plurality of pages to be printed by the printing apparatus.

6 Claims, 8 Drawing Sheets

FIG.7A FIG.7B FIG.7C
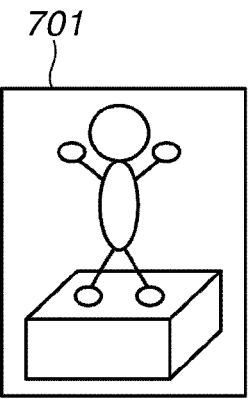 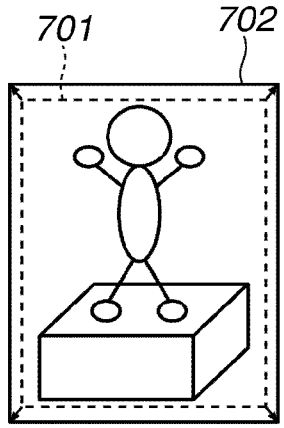 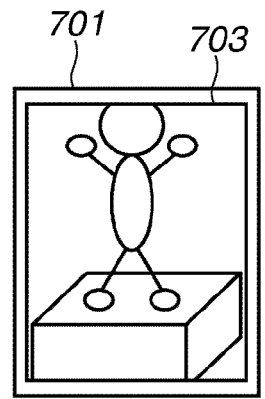
FIG.8A FIG.8B
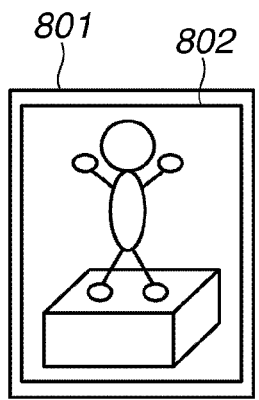 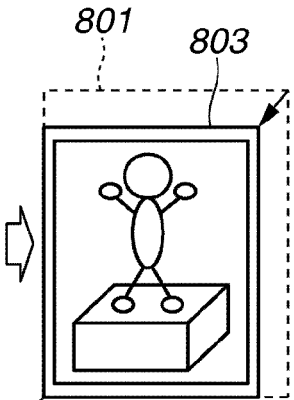
FIG.8C FIG.8D
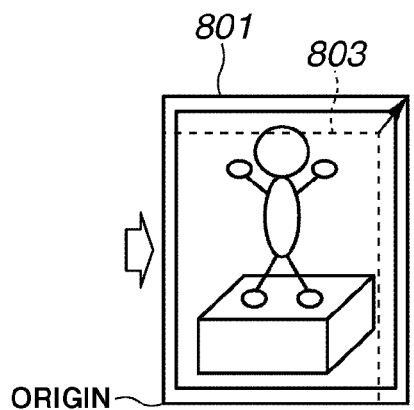 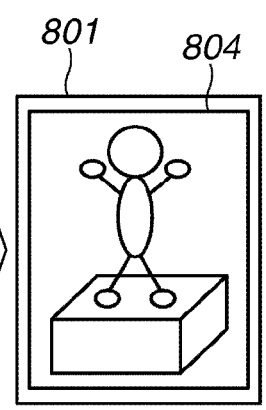

INFORMATION PROCESSING APPARATUS, INFORMATION PROCESSING METHOD, AND PRINT CONTROL PROGRAM

BACKGROUND OF THE INVENTION

1. Field of the Invention

The present invention relates to an information processing apparatus, an information processing method, and related print control program. More particularly, the present invention relates to a technique for enabling an information processing apparatus to generate print data with print settings changeable on a page-by-page basis, and relates to its processing method and related print control program.

2. Description of the Related Art

In general, a printing system can include a host computer and a printer. A printer driver installed in the host computer can convert output information, if generated by application software, into print data and can transmit the print data to a printer. In such a printing system, the printer driver can display a dialog to enable a user to set a paper size, a paper type, and other print information, before the application software outputs drawing data. Print settings by the printer driver can be performed in units of print job. Thus, common print settings are applied to the entire print object for each job.

Of various entries for the print settings, a user can select a borderless printing according to which a print object image is fully printed on a recording paper without any margin. For example, as discussed in Japanese Patent Application Laid-Open No. 2001-26148, when borderless printing is selected, the printer driver can slightly enlarge a print object image to have an enlarged size extending out of a recording paper. A printer can receive enlarged print data and output a borderless print image.

However, according to the borderless printing of the above conventional technique, a part of ink will be discharged outside the edges of the paper sheet. To recover the ink discharged outside of the paper edges, a printer can be equipped with an ink absorbing member in a platen region. In other words, a printer can employ a structure capable of preventing the platen from being contaminated by the discharged ink.

In general, when a pigment ink is printed on a paper, its permeability is poor. When a pigment ink adheres on an ink absorbing member, a relatively large amount of pigment will remain on the surface of the ink absorbing member. The pigment remaining on the surface of the ink absorbing member not only contaminates a printing paper but also may cause a malfunction of a printer in conveyance of the paper.

Meanwhile, there is a method applicable to a printer that uses pigment ink and performs borderless printing. The method includes forming a black color by combining CMY color inks (i.e., dye inks) without using pigment black ink.

A number of recent printers have an automatic two-sided printing function, according to which print object images can be automatically printed on both front and reverse faces of a paper. On the other hand, according to a conventional two-sided printing, a manual work by a user is required to reverse a paper after the printing of the front face is finished. Otherwise, the printing of a reverse face cannot be started. The automatic two-sided printing can eliminate the manual work by a user.

When the automatic two-sided printing is performed for a particular type of paper, it is often preferable to differentiate the print settings for each of the front and reverse faces. For example, when the automatic two-sided printing is performed for a postcard, a text printing using a black color is applied to the front face (i.e., an address face). In this case, pigment black ink is preferably used to form high quality black letters which cause less bleeding of ink.

On the other hand, color inks are preferably used for the printing of the reverse face (i.e., a communication face) so as to form a higher quality image. Furthermore, borderless printing is preferably applied to the reverse face (i.e., communication face) when a reverse face image includes photographs and illustrations.

According to the WINDOWS (registered trademark and product name), i.e., an operating system (OS) provided by Microsoft Corporation, print settings of a printer driver (referred to as DEVMODE) can be changed on the page-by-page basis. Therefore, the output size by application software is adjustable by changing print settings of borderless printing on the page-by-page basis. The print data having a desired layout can be generated.

For example, when an automatic two-sided printing is applied to a postcard, monochrome printing using pigment black ink can be applied to an address face with an output paper size "postcard" (i.e., at a magnification 100%). Meanwhile, borderless color printing can be applied to a communication face with an output paper size "postcard."

However, according to the Mac OS X (product name), i.e., the operating system (OS) provided by Apple Computer Inc., enlargement/reduction processing is performed by a rendering section of the OS and, according to the spec of the OS, changing an enlargement/reduction rate on the page-by-page basis cannot be allowed. Thus, a common enlargement/reduction rate is applied to the entire print object.

As a result, the following problem will arise when a borderless printing is applied to the reverse face (i.e., communication face). For example, if the drawing data of application software are enlarged to have a size equivalent to 105% of a recording paper, not only the reverse face data (i.e., communication face data) but also the front face data (i.e., address face data) are similarly enlarged to have a 105% size and the borderless printing is applied to the front face. In this case, as described previously, using pigment black ink for the borderless printing is not preferable. In other words, it is difficult to print high quality letters which causes less bleeding of ink on the front face (i.e., address face).

Therefore, even if a printer has an automatic two-sided printing function, a user independently performs the printing of front face (i.e., address face) and the printing of reverse face (i.e., communication face). Not only the operation is time-consuming and troublesome for a user, but also the user cannot make full use of the automatic two-sided printing function of the printer.

Furthermore, even in a printer using only dye inks, if a printer driver operates under the control of the OS that allows a rendering section of the OS to change an enlargement/reduction rate only in units of print job, the borderless full-page printing will be equally applied to both a communication face and an address face. In other words, as previously described, the enlargement/reduction rate cannot be changed for each of the front and reverse faces.

Hence, in the borderless printing, a printer driver receives the data larger than an actual printing paper size, including enlarged print data for an address face. For example, a zip code must be written in a predetermined frame pattern on a postcard. However, if the borderless printing is applied to a postcard, the printing of a zip code may deviate from the designated position, with excessively large figures printed on the postcard.

SUMMARY OF THE INVENTION

The present invention is directed to a technique capable of solving the above-described problems. For instance, the present invention is to provide a print control system that enables a user to designate a borderless printing on a page-by-page basis under the control of an operating system that allows changing an enlargement rate in units of job.

According to an aspect of the present invention, an information processing apparatus is provided which is adapted to operate under the control of an operating system configured to allow changing an enlargement rate in units of a job and can generate print data corresponding to a plurality of pages to be printed by a printing apparatus. The apparatus includes a setting input unit configured to input borderless print settings for performing a borderless printing and bordered print settings for performing a bordered printing applied to a predetermined page; an enlargement designation unit configured to instruct an enlargement rate to the operating system when the borderless print settings are input and set by the setting input unit; a decision unit configured to determine whether a page to be processed is the predetermined page when the bordered print settings applied to the predetermined page are input by the setting input unit; a margin creation unit configured to form a margin in a peripheral region of the data enlarged by the operating system when the page to be processed is identified as the predetermined page according to a decision by the decision unit; and a print data generation unit configured to generate print data corresponding to a plurality of pages to be printed by the printing apparatus based on the data enlarged by the operating system and the data having the margin formed by the margin creation unit.

According to another aspect of the present invention, an information processing method is provided for an information processing apparatus that operates under the control of an operating system configured to allow changing an enlargement rate in units of a job and of which can generate print data corresponding to a plurality of pages to be printed by a printing apparatus. The method includes inputting borderless print settings for performing a borderless printing and bordered print settings for performing a bordered printing applied to a predetermined page; instructing an enlargement rate to the operating system when the borderless print settings are input and set; determining whether a page to be processed is the predetermined page when the bordered print settings applied to the predetermined page are input; forming a margin in a peripheral region of the data enlarged by the operating system when the page to be processed is identified as the predetermined page; and generating print data corresponding to a plurality of pages to be printed by the printing apparatus based on the data enlarged by the operating system and the data having the formed margin.

According to another aspect of the present invention, a computer readable medium containing computer-executable instructions is provided for controlling an information processing apparatus that can operate under the control of an operating system configured to allow changing an enlargement rate in units of a job and can generate print data corresponding to a plurality of pages to be printed by a printing apparatus. The computer readable includes computer-executable instructions for inputting borderless print settings for performing a borderless printing and bordered print settings for performing a bordered printing applied to a predetermined page; computer-executable instructions for instructing an enlargement rate to the operating system when the borderless print settings are input and set; computer-executable instructions for determining whether a page to be processed is the predetermined page when the bordered print settings applied to the predetermined page are input; computer-executable instructions for forming a margin in a peripheral region of the data enlarged by the operating system when the page to be processed is identified as the predetermined page; and computer-executable instructions for generating print data corresponding to a plurality of pages to be printed by the printing apparatus based on the data enlarged by the operating system and the data having the formed margin.

According to another aspect of the present invention, a print control program readable by a computer and installable in an information processing apparatus that can operate under the control of an operating system configured to allow changing an enlargement rate in units of a job and can generate print data corresponding to a plurality of pages to be printed by a printing apparatus. The program includes a setting input step of inputting borderless print settings for performing a borderless printing and bordered print settings for performing a bordered printing applied to a predetermined page; an enlargement designation step of instructing an enlargement rate to the operating system, when the borderless print settings are input and set in the setting input step; a decision step of determining whether a page to be processed is the predetermined page, when the bordered print settings applied to the predetermined page are input in the setting input step; a margin creation step of forming a margin in a peripheral region of the data enlarged by the operating system, when the page to be processed is identified as the predetermined page according to a decision in the decision step; and a print data generation step of generating print data corresponding to a plurality of pages to be printed by the printing apparatus, based on the data enlarged by the operating system and the data having the margin formed in the margin creation step.

According to another aspect of the present invention, an information processing apparatus that adapted to operate under the control of an operating system configured to allow changing an enlargement rate in units of a job and of which can generate print data corresponding to a plurality of pages to be printed by a printing apparatus. The apparatus includes a setting input unit configured to input borderless print settings for enlarging drawing data given from application software and performing a borderless printing and same size print settings for performing a same size printing applied to a predetermined page; an enlargement designation unit configured to instruct an enlargement rate to the operating system when the borderless print settings are input and set; a decision unit configured to determine whether a page to be processed is the predetermined page when the same size print settings applied to the predetermined page are input by the setting input unit; a reduction designation unit configured to instruct to the application software, a reduction rate equivalent to a reciprocal of the enlargement rate, when the page to be processed is identified as the predetermined page according to a decision by the decision unit; and a print data generation unit configured to generate print data corresponding to a plurality of pages to be printed by the printing apparatus based on the data enlarged by the operating system.

According to another aspect of the present invention, an information processing method is provided for an information processing apparatus that can operate under the control of an operating system configured to allow changing an enlargement rate in units of job and can generate print data corresponding to a plurality of pages to be printed by a printing apparatus. The method includes inputting borderless print settings for enlarging drawing data given from application software and performing a borderless printing, and same size print settings for performing a same size printing applied to a predetermined page; instructing an enlargement rate to the operating system when the borderless print settings are input and set; determining whether a page to be processed is the predetermined page when the same size print settings applied to the predetermined page are input; instructing, to the application software, a reduction rate equivalent to a reciprocal of the enlargement rate, when the page to be processed is identified as the predetermined page; and generating print data corresponding to a plurality of pages to be printed by the printing apparatus based on the data enlarged by the operating system.

According to another aspect of the present invention, a computer readable medium containing computer-executable instructions are provided for controlling an information processing apparatus that can operate under the control of an operating system configured to allow changing an enlargement rate in units of job and can generate print data corresponding to a plurality of pages to be printed by a printing apparatus. The computer readable medium includes computer-executable instructions for inputting borderless print settings for enlarging drawing data given from application software and performing a borderless printing, and same size print settings for performing a same size printing applied to a predetermined page; computer-executable instructions for instructing an enlargement rate to the operating system when the borderless print settings are input and set; computer-executable instructions for determining whether a page to be processed is the predetermined page when the same size print settings applied to the predetermined page are input; computer-executable instructions for instructing, to the application software, a reduction rate equivalent to a reciprocal of the enlargement rate, when the page to be processed is identified as the predetermined page; and computer-executable instructions for generating print data corresponding to a plurality of pages to be printed by the printing apparatus based on the data enlarged by the operating system.

According to another aspect of the present invention, a print control program readable by a computer and installable in an information processing apparatus that can operate under the control of an operating system configured to allow changing an enlargement rate in units of job and can generate print data corresponding to a plurality of pages to be printed by a printing apparatus. The program includes a setting input step of inputting borderless print settings for enlarging drawing data given from application software and performing a borderless printing, and same size print settings for performing a same size printing applied to a predetermined page; an enlargement designation step of instructing an enlargement rate to the operating system when the borderless print settings are input and set in the setting input step; a decision step of determining whether a page to be processed is the predetermined page when the same size print settings applied to the predetermined page are input in the setting input step; a reduction designation step of instructing, to the application software, a reduction rate equivalent to a reciprocal of the enlargement rate, when the page to be processed is identified as the predetermined page according to a decision in the decision step; and a print data generation step of generating print data corresponding to a plurality of pages to be printed by the printing apparatus based on the data enlarged by the operating system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A through 7C are schematic views illustrating drawing data produced by the information processing apparatus that executes the first print related processing according to the exemplary embodiment of the present invention.

FIGS. 8A through 8D are schematic views illustrating drawing data produced by the information processing apparatus that executes the second print related processing according to the exemplary embodiment of the present invention.

DETAILED DESCRIPTION OF THE EMBODIMENTS

Figure 1:
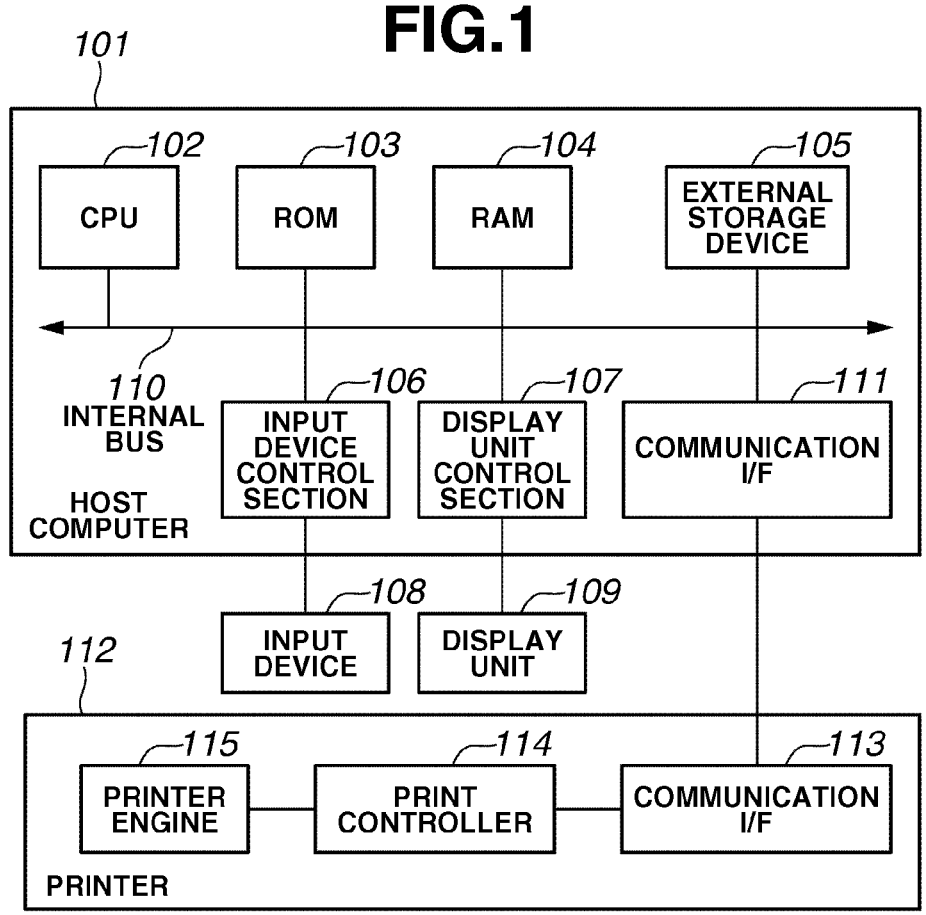
FIG. 1 is a block diagram illustrating an example of a hardware arrangement of an information processing apparatus in accordance with an exemplary embodiment of the present invention.

The following description of exemplary embodiment(s) is/are merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Exemplary embodiments of the invention will now be herein described in detail below with reference to the drawings.

FIG. 1 is a block diagram illustrating an example of an information processing apparatus according to an exemplary embodiment of the present invention, which is configured as a printing system including a host computer 101 and a printer 112 which are adapted to communicate with each other.

The host computer 101 includes a CPU 102 that can control various sections according to program(s) stored in a RAM 104 or an external storage device 105 or the like. The CPU 102 can execute the program of a printer driver (i.e., print control program) applicable to the printer 112. The operation of the printer driver is described in detail later with reference to flowcharts shown in FIGS. 5 and 6. The CPU 102 has the capability of producing output information based on application program(s), converting the output information into output commands, and transmitting the output commands to the printer 112 according to a predetermined protocol.

Furthermore, the host computer 101 includes a ROM 103 and a RAM 104. The CPU 102 can execute a BIOS program stored in the ROM 103. The ROM 103 stores font data, for example. The RAM 104 can be used by the CPU 102 to write or read necessary data. When the CPU 102 activates the printer driver, program codes of the printer driver are loaded to the RAM 104.

The external storage device 105 can store program codes readable by the CPU 102. The external storage device 105 is a device capable of realizing function(s) of the present exemplary embodiment, which can be constituted by any one of FD, CD-RW, HDD or the like.

Furthermore, the host computer 101 includes an input device control section 106, a display unit control section 107, an internal bus 110, and a communication interface (I/F) 111. The input device control section 106 can control an input device 108, such as a keyboard or a mouse. The display unit control section 107 can control a display unit 109, such as a CRT. The internal bus 110 includes a data bus and a system bus that can realize data communication among the functional constituent components in the host computer 101.

The communication I/F 111 can control communications between the host computer 101 and the printer 112 to realize bidirectional communications. The communication I/F 111 can be a serial interface, such as USB and IEEE1394, or a parallel interface, such as CENTRONICS and SCSI, or any other type of interface that can realize bidirectional communications.

The printer 112 includes a communication I/F 113, a print controller 114, and a printer engine 115. The print controller 114 can receive printer commands via the communication I/F 113 and control the printer engine 115 to perform printing based on the printer commands. The printer engine 115 is a mechanism for shifting a printer head and for conveying a recording medium.

In the present exemplary embodiment, an operating system (OS) running on the host computer 101 can enlarge or reduce drawing data produced from application software. An enlargement rate can be changed in units of job, although changing the enlargement rate on the page-by-page basis is unfeasible. For example, Apple computer, Inc. provides Mac OS X (product name) as this kind of operating system.

Figure 2:
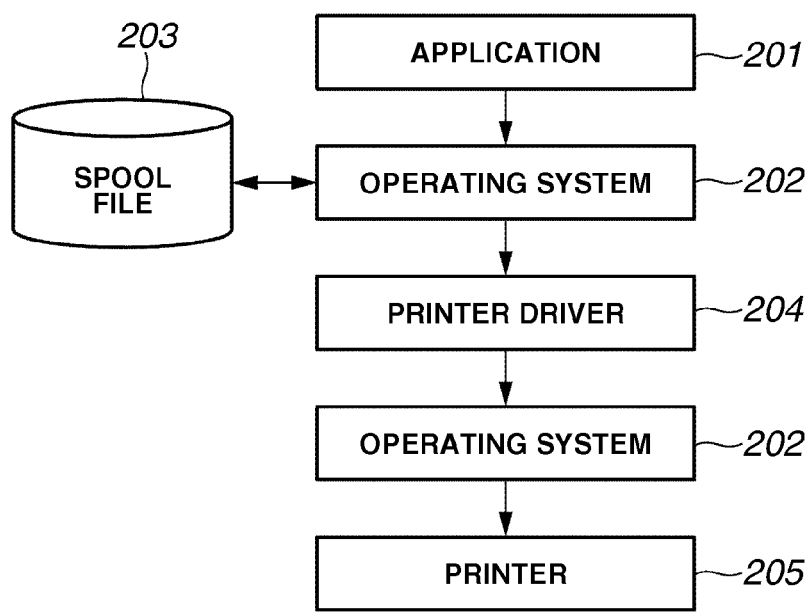
FIG. 2 is a block diagram illustrating an example arrangement of a software module operating in the information processing apparatus in accordance with an exemplary embodiment of the present invention.

FIG. 2 is a block diagram illustrating print processing performed by the OS. When the print processing is started, an application 201 sends drawing data to an operating system 202 based on document data (image data) created by a user. As later described, an output size of the drawing data is designated beforehand by the printer driver based on the use of extended device driver interface (DDI). The operating system 202 temporarily stores the drawing data received from the application 201 as a spool file 203 in the external storage device 105 shown in FIG. 1. Then, the operating system 202 loads a printer driver 204 applicable to a printer (i.e., an output destination).

The operating system 202 applies band processing to the drawing data loaded from the spool file 203, creates rasterized data in increments of one band, and successively sends the rasterized data to the printer driver 204. In this case, the operating system 202 enlarges the drawing data supplied from the application 201 with an enlargement rate set by the printer driver 204, and sends the enlarged data (i.e., rasterized data) to the printer driver 204.

In this case, it is possible that a rendering section equipped in the operating system 202 performs enlargement/reduction processing to execute the band processing (i.e., segmenting the drawing data in units of a band), and the printer driver 204 performs the conversion of the enlarged/reduced data into rasterized data.

The printer driver 204 converts the received rasterized data into print data and transmits the print data to a printer 205 that can interpret the print data. More specifically, the printer driver 204 converts the rasterized data into print data corresponding to coloring materials of required types of inks (e.g., CMYK color dye inks and a pigment black ink), based on usable ink, discharged quantity of ink, and scanning pass number of inkjet printer head.

Figure 3:
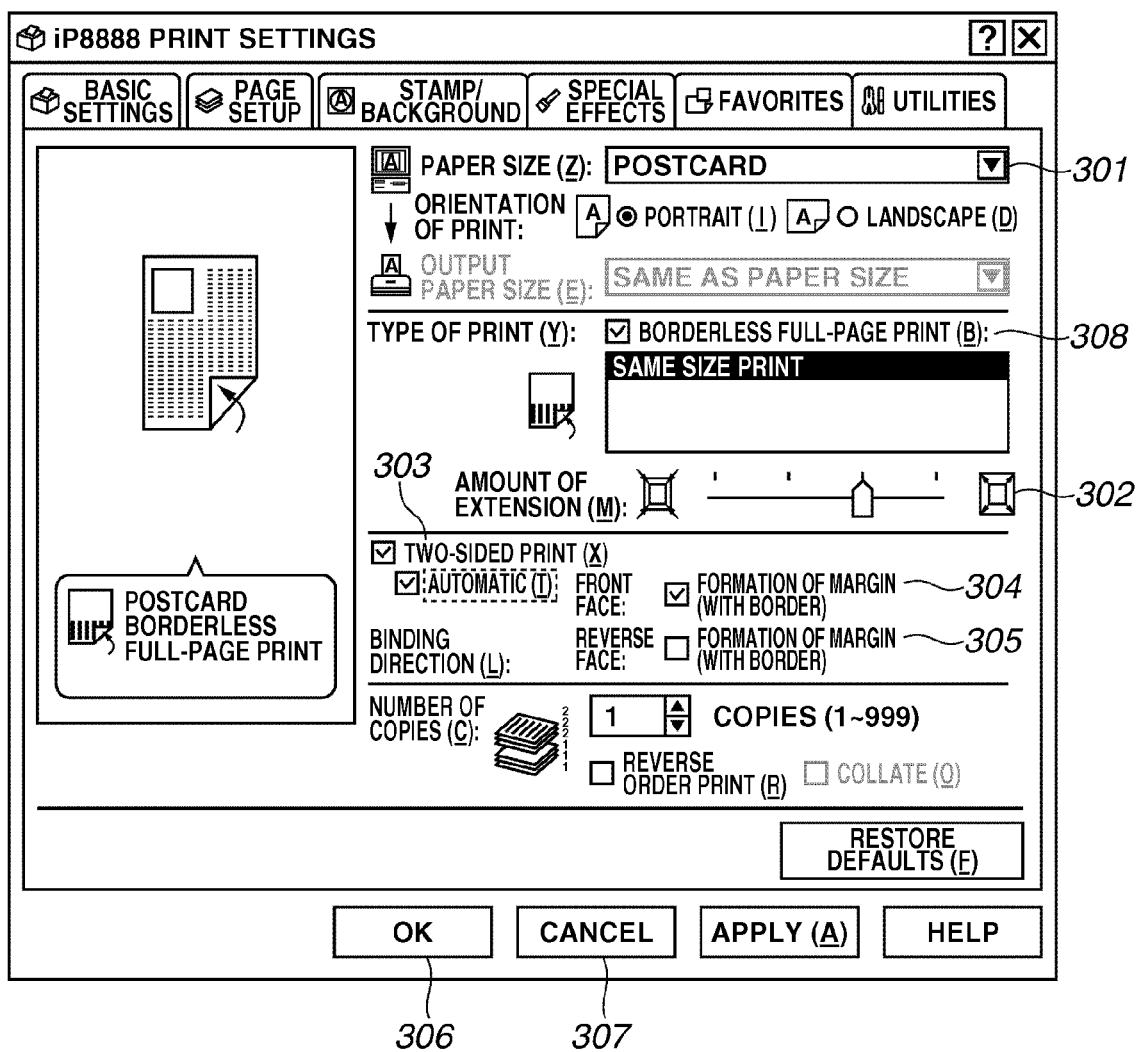
FIG. 3 is a display screen showing an example page setup dialog provided by a printer driver of an exemplary embodiment of the present invention.

FIG. 3 shows an example of a print setting screen provided by the printer driver 204 of FIG. 2. The print setting screen can be read, via the OS, by arbitrary application software to let a user determine print settings, and can be displayed on the display unit 109, such as a monitor, shown in FIG. 1.

A user interface may include of plural dialog sheets, which the printer driver can provide to enable a user to determine print settings. FIG. 3 is an exemplary page setup dialog, which includes a pull-down menu 301 enabling a user to select a preferable paper size. According to the example of FIG. 3, the selected paper size is "postcard."

A check box 308 is an entry enabling a user to designate a borderless full-page printing as a type of print. The borderless full-page printing can be displayed in the check box 308 when a predetermined paper size, such as "postcard" or "A4", is selected. When the borderless full-page printing is selected, the layout of the print object data is adjustable to have a full size selected by a user through the entry 301 without forming any margin.

More specifically, the printer driver 204 instructs an optimum enlargement rate to the operating system 202, so that a bit map of the print object data can be enlarged according to a designated amount of extension compared to the paper size. The printing apparatus receives bit map data transmitted from the printer driver and performs printing based on the received bit map data which are larger than the paper size by the designated amount of extension. Thus, in the printing apparatus, an ink discharged from a printer head reaches outside of the paper.

Therefore, the printing apparatus according to the present exemplary embodiment is equipped with an ink absorbing member at its platen area that can recover the discharged ink. In other words, the printing apparatus according to the present exemplary embodiment employs a structure capable of preventing the platen from being contaminated by an ink discharged to the extended area. With this arrangement, the borderless full-page printing becomes feasible.

A slider bar 302 becomes active (i.e., allows a user to set a value) when the borderless full-page printing is selected by a user with the entry 308. The slider bar 302 indicates an amount of extension of the document data, which are produced by application software, extending out of the paper in the borderless printing operation. The amount of extension becomes larger as the slider bar 302 shifts to the right. For example, when the slider bar 302 is positioned at the leftmost position, the amount of extension is set to 0 (zero). The printer driver 204 does not enlarge the drawing data. The amount of extension increases in accordance with a rightward shift movement of the slider bar 302. In other words, the copy ratio (i.e., magnification) increases in accordance with a rightward shift movement of the slider bar 302. The printer driver enlarges the drawing data according to the increased copy ratio.

A check box 303 is an entry enabling a user to select an "automatic two-sided print." If a "manual two-sided print" is preferable, the user can select the "manual two-sided print"

by putting a check mark in the check box of "two-sided print" and removing the check mark from the box of "automatic." According to the manual two-sided printing, printing of print data corresponding to an odd page of document data is first performed.

When the printing of all odd pages of the document is accomplished, the user reverses the discharged papers printed on one side and returns them to a paper tray. Then, the user performs a predetermined operation for the printing of print data corresponding to an even page of the document data. The manual two-sided printing is not related to the print control of the present invention, and therefore, will not be further described in the following description.

Two check boxes 304 and 305 become active when a user sets the borderless full-page printing (i.e., when a check mark is present in the check box 308) and when a user sets the automatic two-sided printing (i.e., when a check mark is present in the check box 303).

The check box 304 is an entry enabling a user to provide a margin on the front face (i.e., odd page). When the entry "formation of margin" of the check box 304 is ON, the printer driver executes margin creation processing for the front face in a later-described step S512 shown in FIG. 5.

The check box 305 is an entry enabling a user to form a margin on the reverse face (i.e., even page). When the entry "formation of margin" of the check box 305 is ON, the printer driver executes margin creation processing for the reverse face in a later-described step S512 shown in FIG. 5.

In the present exemplary embodiment, there are only two options selectable in the creation of a margin (i.e., margin for the front face or margin for the reverse face). However, it is possible to set a margin in units of a page or a predetermined number of pages. In other words, the user interface of the present invention enables a user to selectively perform the borderless printing for a designated number of pages even when the borderless printing is set. For example, a user can set a borderless printing applied to front faces (i.e., odd pages) only or to reverse faces (even pages) only, or to an arbitrary set of pages (e.g., from Page 3 to Page 6).

An OK button 306 enables a user to finalize the print settings on the dialog shown in FIG. 3 and close the dialog. The printer driver 204 causes the external storage device 105 to store the finalized print settings. A cancel button 307 enables a user to cancel the print settings and close the dialog shown in FIG. 3.

As described above, the user interface (i.e., the print setting dialog) of FIG. 3 enables a user to designate formation of a margin and select bordered printing applied to the front face or the reverse face when both the borderless printing and the automatic two-sided printing are selected. In response to the user's designation, later-described margin creation processing is performed. The bordered printing can be applied to a designated page and the print processing using a pigment ink can be performed.

Figure 4:
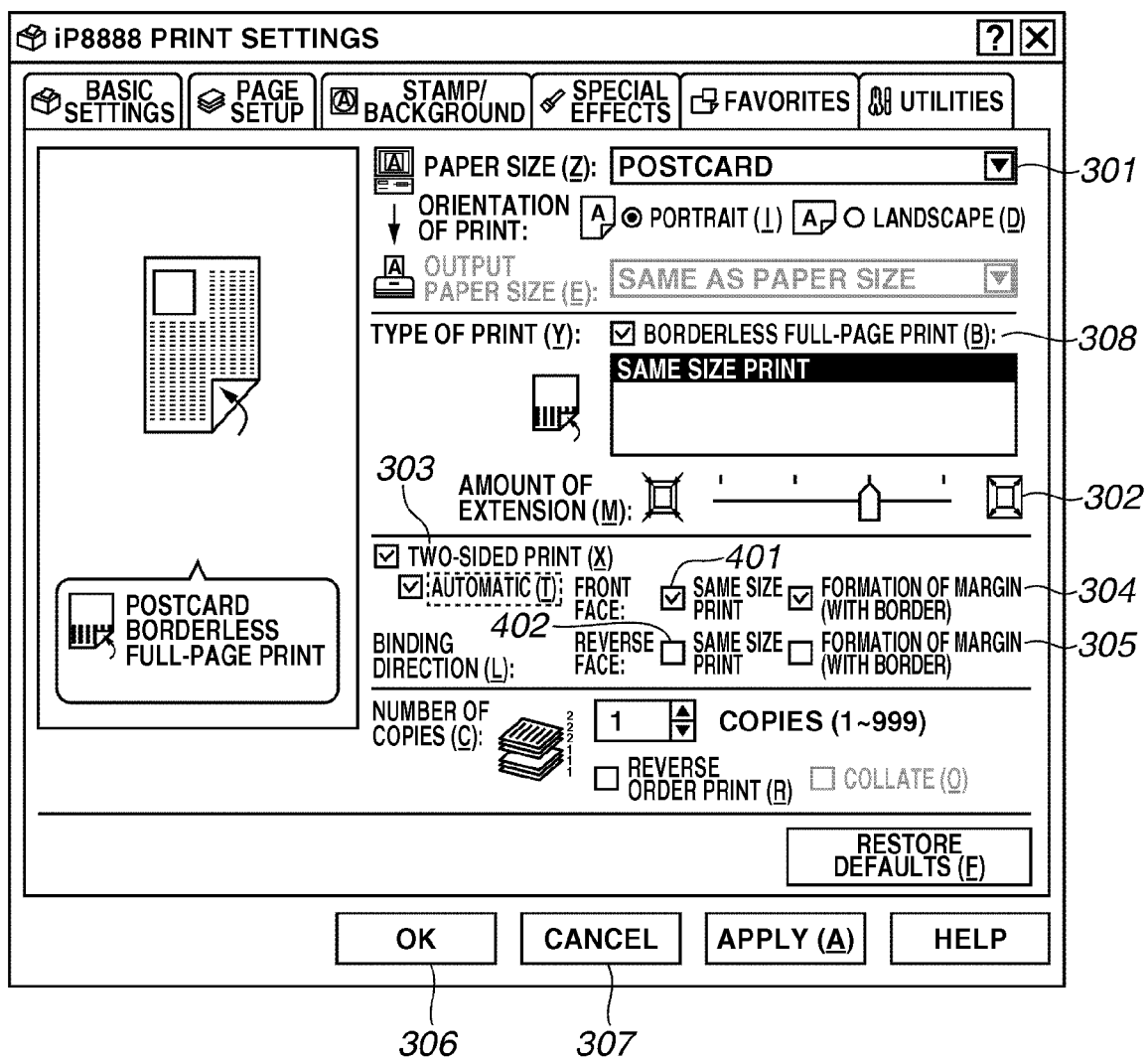
FIG. 4 is a display screen showing an example page setup dialog provided by a printer driver of an exemplary embodiment of the present invention.

FIG. 4 shows one example of a print setting screen provided by the printer driver 204 shown in FIG. 2. The print setting screen can be read, via the OS, by arbitrary application software to let a user determine print settings, and can be displayed on the display unit 109, such as a monitor, shown in FIG. 1. Setting entries similar to those shown in the print setting screen of FIG. 3 are denoted by the same reference numerals and will not be described below.

The print setting screen shown in FIG. 4 is different from the print setting screen of FIG. 3 in that a user can designate an additional option "same size print." Two check boxes 401 and 402 become active when a user selects the borderless full-page printing (i.e., when a check mark is present in the check box 308) and the automatic two-sided printing (i.e., when a check mark is present in the check box 303).

The check box 401 is an entry enabling a user to designate a same size printing applied to the front face (i.e., odd page). When the entry "direct (same size) print" of the check box 401 is ON, the printer driver executes same size creation processing for the front face in a later-described step S609 shown in FIG. 6.

The check box 402 is an entry enabling a user to designate a same size printing applied to the reverse face (i.e., even page). When the entry "same size print" of the check box 402 is ON, the printer driver executes same size creation processing for the reverse face in a later-described step S609 shown in FIG. 6.

Furthermore, according to the print setting screen shown in FIG. 4, the check box 304 becomes active when a user sets the same size print (i.e., when a check mark is present in the check box 401). When a check mark is present in the check box 304, both the same size printing and the bordered printing are applied to a designated page (i.e., a front face).

Thus, even when application software generates document data or image data extending close to the edge of a paper, a margin can be produced and the bordered printing can be realized. And therefore, the print processing using a pigment ink becomes feasible. Furthermore, as the same size printing is selected, the printing of an address (and an addressee) does not deviate from the designated positions. Accordingly, orderly print result can be obtained.

Furthermore, when no check mark is present in the check box 304, no margin is formed on a designated page (i.e., front face) to which the same size printing is applied. Thus, even when the application 201 generates document data (or image data) extending close to the edge of a paper, the data cannot be lost. Furthermore, as the same size printing is selected, the printing of an address (and an addressee) does not deviate from the designated positions. Accordingly, orderly print result can be obtained.

Figure 5:
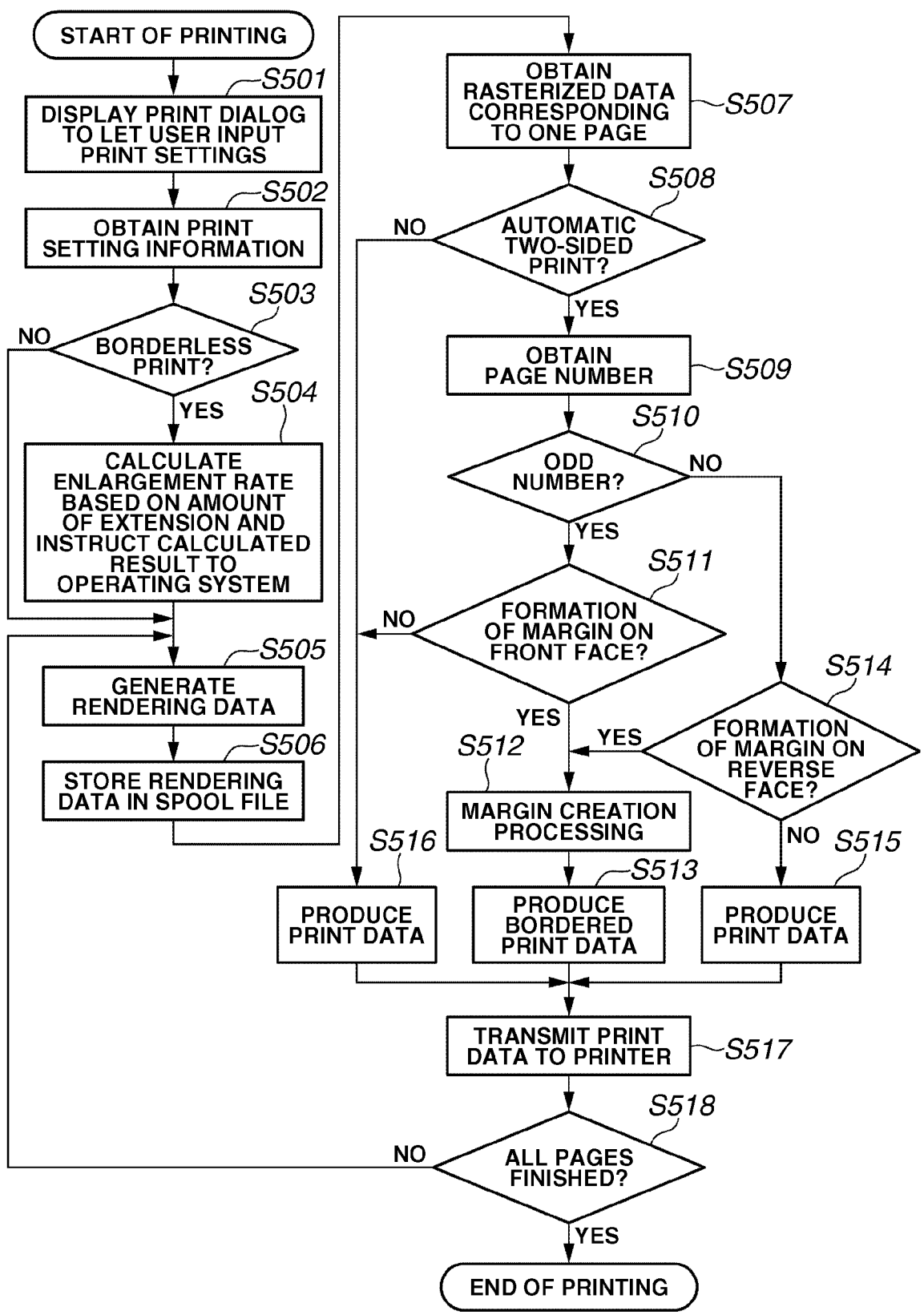
FIG. 5 is a flowchart showing an example of first print related processing performed by the information processing apparatus according to an exemplary embodiment of the present invention.

FIG. 5 is a flowchart showing an example of a first print related processing including margin creation processing performed by a host computer in response to a print instruction given from the application 201 until end of printing. The first print related processing shown in FIG. 5 corresponds to the processing performed by the printer driver stored in the external storage device 105 shown in FIG. 1, although the first print related processing includes a part of the processing performed by application software or the OS to clearly describe the entire operation of the print processing.

First, in step S501, in response to an instruction relating to print settings given from the application 201, the printer driver 204 causes the display unit 109 to display the print dialog shown in FIG. 3. A user can operate on the displayed print dialog with the input device 108 to input or select detailed print settings. In this case, if the borderless printing is applicable to a paper size selected on the page setup dialog of FIG. 3, a user can set a desirable "amount of extension" by changing the lateral position of the slider bar 302. Furthermore, when the automatic two-sided printing is selected, a user can select the "formation of margin" in the check boxes 304 and 305.

When the OK button 306 on the print dialog is depressed by a user, the operating system 202 activates the printer driver 204. In step S502, the printer driver 204 obtains information relating to print settings which are set on the print dialog of FIG. 3. In step S503, the printer driver 204 obtains a setting value relating to the borderless printing which is involved in the obtained information relating to print settings, and determines whether the borderless printing can be applied to a selected paper size.

When the judgment result in the step S503 is NO, the processing flow proceeds to step S505. On the other hand, when the judgment result in the step S503 is YES, the processing flow proceeds to step S504. In the step S504, the printer driver 204 calculates an enlargement rate of the drawing data produced by the application 201, based on an amount of extension set by a user on the dialog of FIG. 3. The printer driver 204 instructs a calculated enlargement rate to the operating system 202.

As described previously, in the exemplary embodiment of present invention, the operating system can allow changing the enlargement rate in units of job. The printer driver 204 instructs the enlargement rate once to the operating system 202 when each job is started.

Then, in step S505, the application 201 receives, from the printer driver 204 based on the use of extended DDI, a paper size selected on the page setup dialog shown in FIG. 3 or a printable region of the selected paper size. Then, the application 201 outputs, to the operating system 202, drawing data of a print object corresponding to the received size. In step S506, the operating system 202 causes the spool file 203 to temporarily store the information relating to print settings set in the step S501 and the drawing data produced by the application 201 in the step S505.

Subsequently, in step S507, the operating system 202 rasterizes the drawing data produced from the application 201 and the printer driver 204 obtains the rasterized data. In this case, if an enlargement rate is designated by the printer driver 204 in the step S504, the operating system 202 can use its own enlarging function to enlarge and rasterize the drawing data. Then, the operating system 202 outputs, to the printer driver 204, the produced rasterized data corresponding to one page.

In step S508, the printer driver 204 obtains a setting value relating to the automatic two-sided printing which is involved in the obtained information relating to print settings, and determines whether the automatic two-sided printing is selected. When the judgment result in the step S508 is NO, the processing flow proceeds to step S516. In step S516, the printer driver 204 executes ordinary processing for producing print data including designation of ink discharge amount, as described previously, according to respective print setting values. Then, the processing flow proceeds to step S517. On the other hand, when the judgment result in the step S508 is YES, the processing flow proceeds to step S509 to obtain a page number of a presently processed page.

Next, in step S510, the printer driver 204 determines whether the page number of the presently processed page is an odd page. When the judgment result in the step S510 is YES, the processing flow proceeds to step S511. In the step S511, the printer driver 204 obtains a setting value relating to the entry "formation of margin on front face" of the check box 304 shown in FIG. 3 which is involved in the obtained information relating to print settings. Then, the printer driver 204 determines whether the entry "formation of margin on front face" of the check box 304 is set to ON.

On the other hand, when the judgment result in the step S510 is NO, the processing flow proceeds to step S514. In the step S514, the printer driver 204 obtains a setting value relating to the entry "formation of margin on reverse face" of the check box 305 shown in FIG. 3 which is involved in the obtained information relating to print settings. Then, the printer driver 204 determines whether the entry "formation of margin on reverse face" of the check box 305 is set to ON.

When the judgment result in the step S511 is NO, the processing flow proceeds to the step S516. When the borderless printing is applicable to a select paper size, the printer driver 204 produces print data for the borderless printing so as to perform the printing using dye inks without using a pigment black ink. Then, the processing flow proceeds to the step S517. When the judgment result in the step S511 is YES, the processing flow proceeds to step S512 to execute the margin creation processing.

When the judgment result in the step S514 is NO, the processing flow proceeds to step S515. In the step S515, the printer driver 204 executes ordinary processing for producing print data similar to that described in the step S516. Then, the processing flow proceeds to the step S517. When the judgment result in the step S514 is YES, the processing flow proceeds to step S512 to execute the margin creation processing.

If the judgment result of step S503 relating to the borderless printing is OFF, the judgment result in the steps S511 and S514 is always NO because no formation of the margin is necessary.

Next, the margin creation processing of the step S512 will be described below in more detail. In particular, FIGS. 7A through 7C are schematic views illustrating the margin creation processing for the borderless printing. FIG. 7A shows a printable region 701 of the drawing data produced by the application software, when the borderless printing is applicable to a paper size selected by a user on a pop-up menu 301 of the page setup dialog shown in FIG. 3. When the borderless printing is selected, the printable region 701 is identical to the paper size because no margin is necessary.

When a user sets a desirable amount of extension with the slider bar 302 of the print dialog shown in FIG. 3, the drawing data can be enlarged and rasterized according to the amount of extension being set by the user. FIG. 7B shows enlarged drawing data 702 in comparison with the paper size 701.

The margin creation processing performed in the step S512 includes a process of producing print data which can be realized by extracting a printable region 703 corresponding to an ordinary printing, as shown in FIG. 7C. In this case, the printer driver can determine an optimum layout so that the drawing data can be centered on a paper. The loss of essential drawing data can be suppressed as much as possible, although the processed drawing data of FIG. 7C cannot include the original drawing data at the peripheral region (refer to FIG. 7A).

However, the bordered printing is applicable to a page (i.e., front face or reverse face) to which the margin creation processing is applied. Thus, the printer 205 can perform the print processing using a pigment ink. In general, when application software forms a margin on an address face, substantially no problem arises because no data is printed in the peripheral region on the address face.

Furthermore, the width of a margin can be a constant value or an arbitrary value designated by a user. Furthermore, the data extracted by the margin creation processing can be drawing data (expressed in terms of a drawing function not being rasterized) generated by the operating system 202 or can be image data produced through the rasterized processing.

Now referring back to FIG. 5, after the margin creation processing of the step S512 is accomplished, the processing flow proceeds to step S513. As the data produced in the step S512 are the ordinary printing data corresponding to the printable region 703 not applied to the borderless printing, the printer driver can produce the print data so as to perform the printing with a pigment black ink, for example, for black monochrome text data.

More specifically, when the paper type is postcard, the printer driver 204 adds an address face command. The printer 205 performs, for a page to which an address face command is added, the print processing of monochrome data with a pigment black ink.

Meanwhile, with respect to a page to which the borderless printing is applied (refer to the above-described step S515 and step S516), the printer driver 204 adds a communication face command if the paper type is postcard. The printer 205 performs, for a page to which a communication face command is added, the print processing of monochrome data with a dye black ink or a process black composed of dye color inks.

Then, in the step S517, the printer driver 204 transmits the produced print data to the printer 205 via the operating system 202. In step S518, the printer driver 204 determines whether the processing of all pages is completed. When the judgment result in the step S518 is YES, the printer driver 204 terminates the print processing. On the other hand, when the judgment result in the step S518 is NO, the processing flow returns to the step S505 to repeat the above-described processing.

As described above, even when the OS has no capability of changing an enlargement rate on the page-by-page basis, the printer driver can selectively generate, on the page-by-page basis, the print data for the bordered printing or the print data for the borderless printing, when the borderless printing and the automatic two-sided printing are selected.

The printing apparatus can perform the print processing based on the received print data. For example, the printing apparatus can apply a borderless printing using a dye ink to the communication face. Meanwhile, the printing apparatus can apply a bordered printing to the address face, so that monochrome data of an address and an addressee can be printed with a pigment black ink. As a result, the printing quality can be improved.

As described previously, a predetermined pattern of zip code frame is printed at a designated position on the address face of a postcard. In such a case, the magnification of a print result relative to the original can be adjusted in the following manner.

Figure 6:
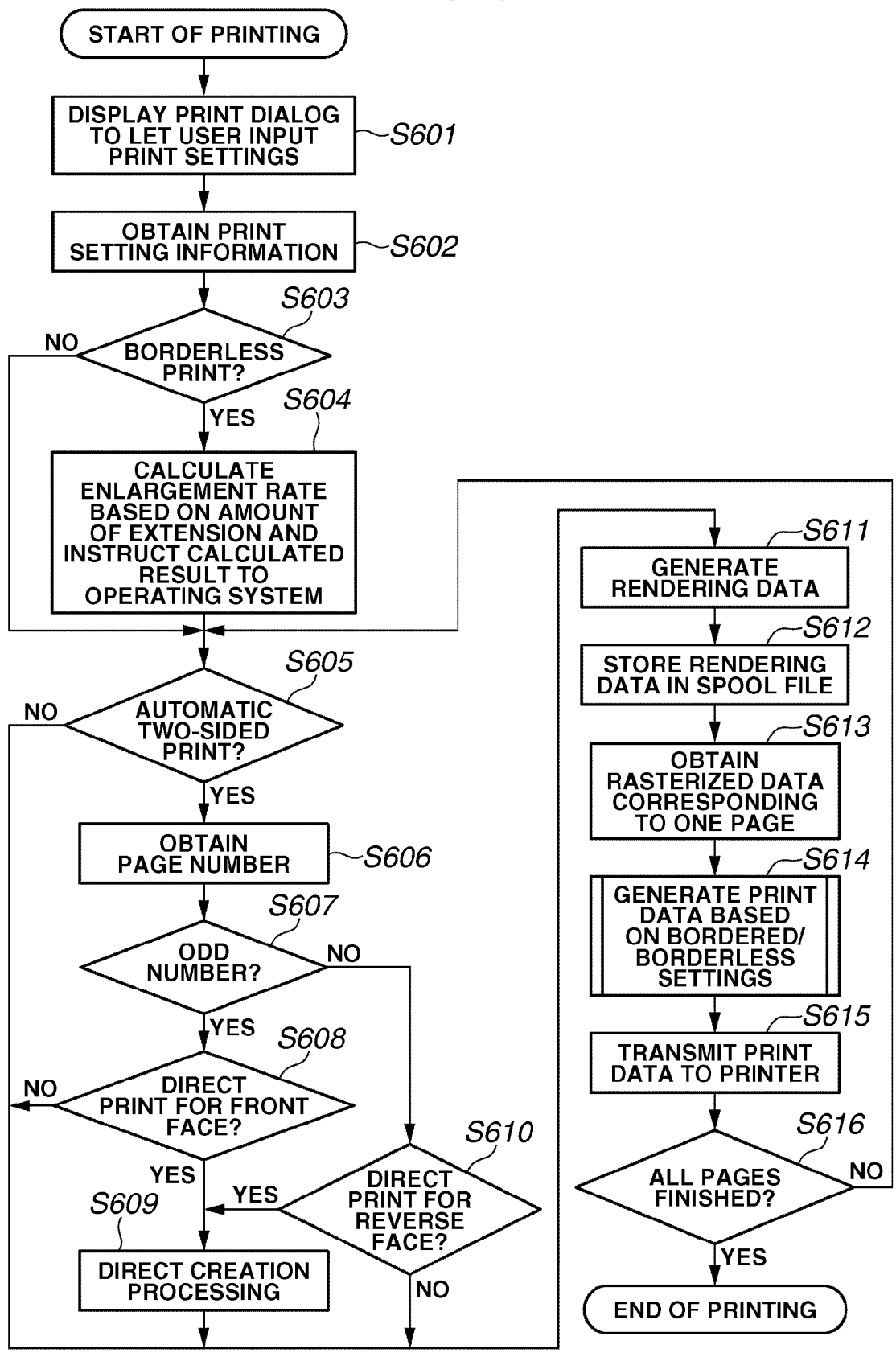
FIG. 6 is a flowchart showing an example of second print related processing performed by the information processing apparatus according to an exemplary embodiment of the present invention.

FIG. 6 is a flowchart showing second print related processing including margin creation processing performed by a host computer in response to a print instruction given from the application 201 until end of printing. The second print related processing shown in FIG. 6 corresponds to the processing performed by the printer driver stored in the external storage device 105 shown in FIG. 1, although the second print related processing includes a part of the processing performed by application software or the OS to clearly describe the entire operation of the print processing.

First, in step S601, in response to an instruction relating to print settings given from the application 201, the printer driver 204 causes the display unit 109 to display the print dialog shown in FIG. 4. A user can operate on the displayed print dialog with the input device 108 to input or select detailed print settings. In this case, if the borderless printing is applicable to a paper size selected on the page setup dialog of FIG. 4, a user can set a desirable "amount of extension" by changing the lateral position of the slider bar 302. Furthermore, when the automatic two-sided printing is selected, a user can set the "same size print" in the check boxes 401 and 402. Furthermore, similar to the page setup dialog of FIG. 3, a user can select the "formation of margin" in the check boxes 304 and 305.

When the OK button 306 on the print dialog is depressed by a user, the operating system 202 activates the printer driver 204. In step S602, the printer driver 204 obtains information relating to print settings which are set on the print dialog of FIG. 4. In step S603, the printer driver 204 obtains a setting value relating to the borderless printing which is involved in the obtained information relating to print settings, and determines whether the borderless printing can be applied to a selected paper size.

When the judgment result in the step S603 is NO, the processing flow proceeds to step S605. On the other hand, when the judgment result in the step S603 is YES, the processing flow proceeds to step S604. In the step S604, the printer driver 204 calculates an enlargement rate of the drawing data produced by the application 201, based on an amount of extension set by a user on the dialog of FIG. 4. The printer driver 204 instructs a calculated enlargement rate to the operating system 202.

As described previously, in the exemplary embodiment of present invention, the operating system can allow changing the enlargement rate in units of job. The printer driver 204 instructs the enlargement rate to the operating system 202 when each job is started.

In step S605, the printer driver 204 obtains a setting value relating to the automatic two-sided printing which is involved in the obtained information relating to print settings, and determines whether the automatic two-sided printing is selected. When the judgment result in the step S605 is NO, the processing flow proceeds to step S611. On the other hand, when the judgment result in the step S605 is YES, the processing flow proceeds to step S606. In the step S606, the printer driver obtains a page number of a presently processed page. An initial page number is 1 when the print processing is started.

In step S607, the printer driver 204 determines whether the page number of the presently processed page is an odd page. When the judgment result in the step S607 is YES, the processing flow proceeds to step S608. In the step S608, the printer driver 204 obtains a setting value relating to the entry "direct (same size) print for front face" of the check box 401 shown in FIG. 4 which is involved in the obtained information relating to print settings. Then, the printer driver 204 determines whether the entry "same size print for front face" of the check box 401 is set to ON. When the judgment result in the step S608 is YES, the processing flow proceeds to step S609 to execute the same size creation processing.

On the other hand, when the judgment result in the step S607 is NO, the processing flow proceeds to step S610. In the step S610, the printer driver 204 obtains a setting value relating to the entry "same size print for reverse face" of the check box 402 shown in FIG. 4 which is involved in the obtained information relating to print settings. Then, the printer driver 204 determines whether the entry "same size print for reverse face" of the check box 402 is set to ON. When the judgment result in the step S610 is NO, the processing flow proceeds to step S611.

On the other hand, when the judgment result in the step S610 is YES, the processing flow proceeds to the step S609 to execute the same size creation processing. It is also noted that if the judgment result of step S603 relating to the borderless printing is OFF, the judgment result in the steps S608 and S610 is always NO because no same size creation is necessary.

The same size creation processing in step S609 is performed in the following manner. FIGS. 8A through 8D are schematic views illustrating the size of a document page relating to the same size creation processing.

FIG. 8A shows a paper size 801 selected by a user through the pop-up menu 301 of the page setup dialog shown in FIG. 4. The borderless printing is applicable to the selected paper size 801. In the borderless printing, the layout region of print data is identical to that of the paper size. In this case, the application software can produce drawing data having a margin added in the region 801 of the paper size. Alternatively, the application software can produce drawing data having the layout region corresponding to a printable region 802 of the ordinary printing performed by the printer 205.

When the borderless printing is set and a user sets a desirable amount of extension with the slider bar 302 of the print dialog shown in FIG. 4, the printer driver 204 calculates an enlargement rate corresponding to the amount of extension so that the operating system 202 can enlarge the drawing data based on the calculated enlargement rate. If the printer driver 204 forms a margin on the enlarged drawing data as described in the first print related processing described with reference to FIGS. 5 and 7, a part of the drawing data will be undesirably lost in the print result as shown in FIG. 7C.

To avoid such a drawback, the application software can first reduce the original data with an appropriate reduction rate, which is equivalent to a reciprocal of the enlargement rate, before the operating system enlarges the drawing data with the enlargement rate. The operating system can apply enlargement processing to the reduced drawing data received from the application software and, as a result, can obtain rasterized data identical in size to the original data.

To realize the above processing, the printer driver must instructs a required reduction rate to the application software so that the print object data can be reduced based on the instructed reduction rate to produce the reduced drawing data. Furthermore, it is necessary to determine beforehand, between the printer driver and the application software, a reference position of the paper for positioning the drawing data accurately.

Considering the above, the printer driver returns, to the application software 201, layout information including the reduction rate (i.e., a reciprocal of the enlargement rate) used in the enlargement processing of drawing data and the reference position (i.e., origin) used in the layout of drawing data. In this case, according to the Mac OS X, the origin provided at a lower left position can be always used as the reference position. In such a case, the printer driver can return only the reduction rate as the layout information involving no reference position to the application software 201.

More specifically, in the same size creation processing of the step S609 (see FIG. 6), the printer driver 204 calculates an enlargement rate of drawing data produced by the application software 201, based on an amount of extension set by a user on the dialog of FIG. 4. Then, the printer driver calculates a reciprocal of the enlargement rate (i.e., a reduction rate), and returns layout information including the calculated reduction rate and the origin to the application 201. Then, the processing flow proceeds to step S611.

In the step S611, the application 201 obtains a paper size and the layout information from the printer driver 204 based on the use of extended DDI. Then, with reference to the obtained data, the application 201 reduces the paper size 801 of the original data toward the origin as shown in FIG. 8B and generates drawing data that can suit a reduced region 803.

In step S612, the operating system 202 causes the spool file 203 to temporarily store the drawing data produced by the application 201. In the step S613, the operating system 202 performs enlargement processing with an enlargement rate designated by the printer driver 204 (refer to step S604). With this processing, the printer driver 204 obtains rasterized data (refer to 801 shown in FIG. 8C).

Then, in step S614, the printer driver 204 generates print data based on bordered/borderless settings. The print data generation processing of the step S614 is similar to the processing of steps S510 to S516 in the first print related processing described with reference to FIG. 5. As shown in FIG. 8D, the printer driver 204 produce the print data by extracting the data in a region corresponding to a printable region 804 of the ordinary printing performed by the printer that does not perform the borderless printing.

With the above processing, for a page to which the same size printing is applied, the printer driver can produce the print data in a layout region to which the borderless printing is not applied. Thus, the printer driver can produce the print data so as to perform the printing with a pigment black ink, for example, for black monochrome text data.

More specifically, when the paper type is postcard, the printer driver 204 adds an address face command. The printer 205 executes print processing of monochrome data with a pigment black ink, for the page to which an address face command is added.

On the other hand, with respect to a page to which the borderless printing is applied and no same size printing is applied, the printer driver 204 adds a communication face command when the paper type is postcard. The printer 205 executes print processing of monochrome data with a dye black ink or a process black composed of dye color inks, for the page to which a communication face command is added.

After the print data production processing of the step S614 is accomplished, the processing flow proceeds to step S615. In the step S615, the printer driver 204 transmits the produced print data to the printer 205 via the operating system 202. In step S616, the printer driver 204 determines whether the processing of all pages is completed. When the judgment result in the step S616 is YES, the printer driver 204 terminates the print processing. On the other hand, when the judgment result in the step S616 is NO, the processing flow returns to the step S605 to obtain the next page number and execute the same size creation processing on the page-by-page basis if necessary.

As described above, even when the OS has no capability of changing the enlargement rate on the page-by-page basis, the printer driver can selectively generate, on the page-by-page basis, the print data for the same size printing or the print data for the borderless printing to which a predetermined enlargement rate is applied, when the borderless printing and the automatic two-sided printing are selected.

The printing apparatus can perform the print processing based on the received print data. For example, the printing apparatus can apply a borderless printing using a dye ink to the communication face. Meanwhile, the printing apparatus can apply a bordered printing to the address face, so that monochrome data of an address and an addressee can be printed with a pigment black ink. As a result, the printing quality can be improved. Furthermore, because the same size printing is applied to the address face of a postcard, a zip code frame or any other object can be accurately printed at a predetermined position on a postcard.

As described above, the present exemplary embodiment provides a method for differentiating the settings (i.e., margin and/or magnification) relating to the borderless printing between the front face and the reverse face, when the automatic two-sided printing is selected. The present invention is, however, not limited to the above-described exemplary embodiment. The settings relating to the borderless printing can be selectively changed for an arbitrary number of pages in one print job.

According to the print dialogs shown in FIGS. 3 and 4, when the borderless printing and the automatic two-sided printing are selected, a user can select formation of margin and/or same size printing, for each of the front face (i.e., address face) and the reverse face (i.e., communication face).

Next, a technique for enabling a user to set common settings, front face settings, and reverse face settings for each print job (i.e., an assembly of print data processing) will be described with reference to FIG. 9.

Figure 9:
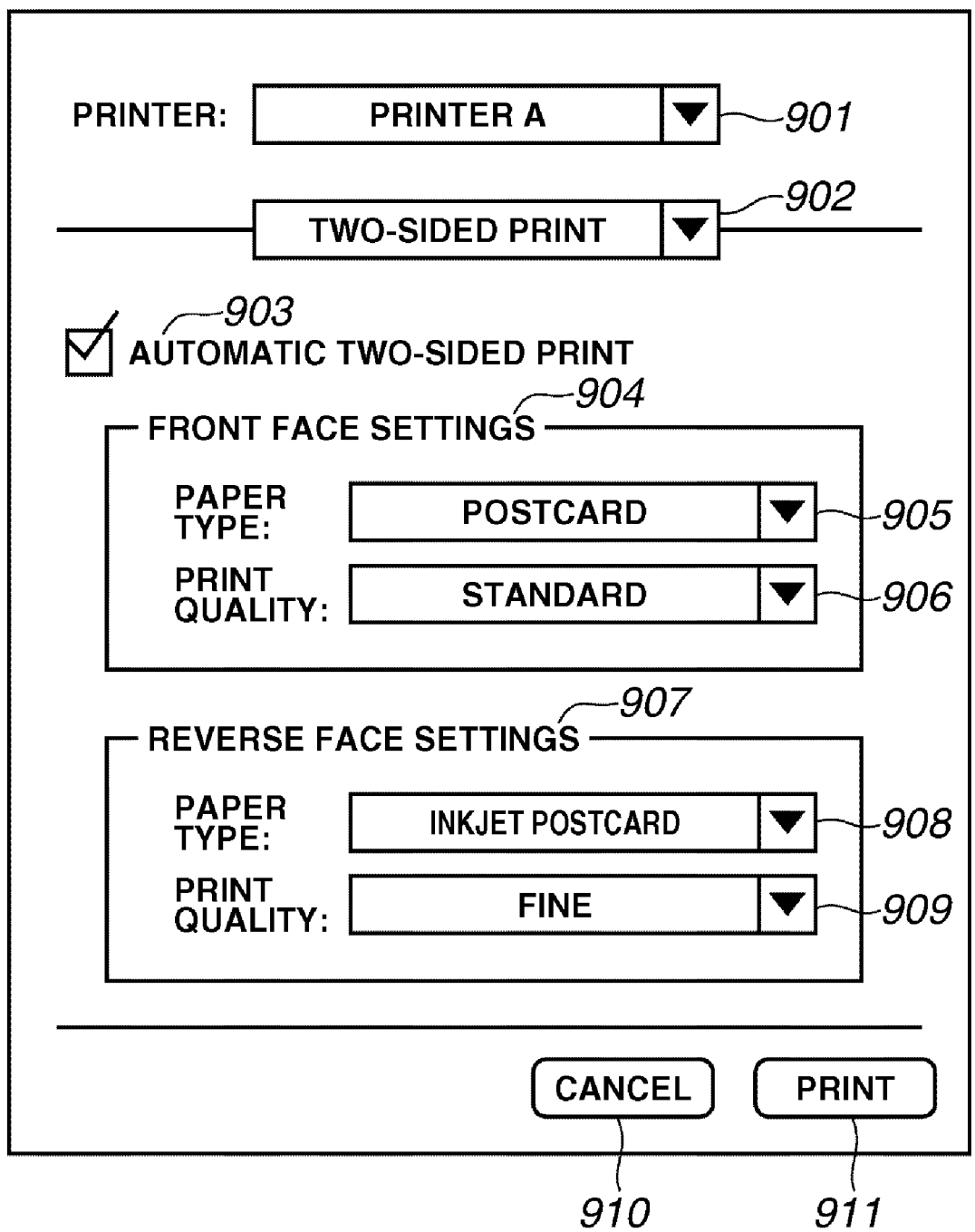
FIG. 9 is a display screen showing one example of a print dialog according to an exemplary embodiment of the present invention.

FIG. 9 is a view showing one example of a print dialog (i.e., a dialog enabling a user to perform printing settings) displayed on the display unit 109, such as a monitor, shown in FIG. 1 in response to a print instruction given from the application 201 shown in FIG. 2.

A pop-up menu 901 is a menu enabling a user to select a desirable printer which outputs a print product. A pop-up menu 902 is a main menu enabling a user to determine various print settings, including paper type and color options. According to the example shown in FIG. 9, "two-sided print" is selected in the pop-up menu 902. A check box 903 enables a user to select the automatic two-sided printing, and is equivalent to the setting entry 303 shown in FIGS. 3 and 4. The setting value in the check box 903 is written into a later-described two-sided printing section 1004 shown in FIG. 10. Entries 904 through 909 become active only when the check box 903 is ON.

The front face settings 904 may include two pop-up menus 905 and 906. The pop-up menu 905 is a menu enabling a user to select a paper type for the front face. The pop-up menu 906 is a menu enabling a user to select a printing quality for the front face. The data set in the front face settings 904 are written into front face settings 1005 in the two-sided print section 1004 shown in FIG. 10.

The reverse face settings 907 may also include two pop-up menus 908 and 909. The pop-up menu 908 is a menu enabling a user to select a paper type for the reverse face. The pop-up menu 909 is a menu enabling a user to select a printing quality for the reverse face. The data set in the reverse face settings 907 are written into reverse face settings 1008 in the two-sided print section 1004 shown in FIG. 10.

A cancel button 910 enables a user to cancel the print settings and close the dialog shown in FIG. 9. A print button 911 enables a user to finalize the print settings and close the dialog shown in FIG. 9, and causes the operating system 202 shown in FIG. 2 to start spool processing.

According to the present exemplary embodiment, the print dialog shown in FIG. 9 can be prepared by the printer driver 204. However, the application software 201 may have the capability of directly setting and obtaining print setting values from the printer driver 204 based on the use of extended DDI. In such a case, the application software 201 can prepare the print dialog shown in FIG. 9.

Figure 10:
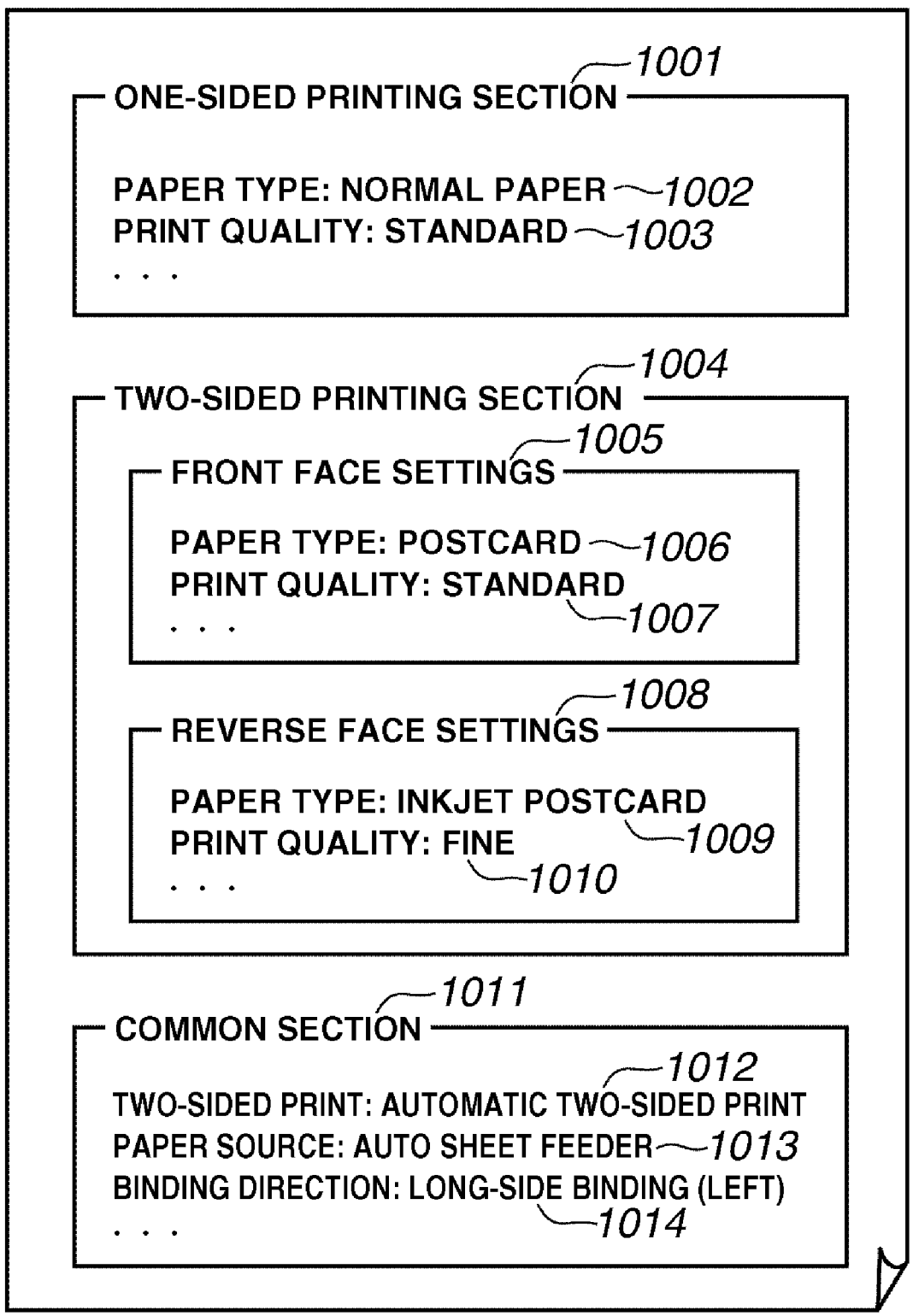
FIG. 10 is a schematic view showing an example of a print setting object according to an exemplary embodiment of the present invention.

FIG. 10 is a schematic view showing a print setting object that can store setting information set by a user through the print dialog of FIG. 9. In general, the "object" is managed as an assembly of data or information. In the present exemplary embodiment, the printer driver 204 can produce a print setting object for each job that can store information relating to print settings. In other words, the printer driver 204 can manage the print setting data in units of job.

The print setting object, storing the information relating to print settings, includes a one-sided printing section 1001, a two-sided printing section 1004, and a common section 1011. The one-sided printing section 1001 can store print settings applied to the one-sided printing. The two-sided printing section 1004 can store print settings applied to the two-sided printing. The common section 1011 can store print settings commonly applied to the entire print job.

For example, the common section 1011 stores print setting values relating to two-sided print 1012, paper feeding method 1013, and binding direction 1014, which are commonly applied to the entire print job. A setting value set by a user through the automatic two-sided print check box 903 of the print dialog shown in FIG. 9 is written into a portion of two-sided print 1012.

When the setting value of two-sided print 1012 is "automatic two-sided print ON," the printer driver 204 writes setting values into the two-sided printing section 1004, with respect to the entry through which a user can set setting values differentiated for each of the front and reverse faces.

The two-sided printing section 1004 may include front face settings 1005 storing the settings relating to the front face and reverse face settings 1008 storing the settings relating to the reverse face. The front face settings 1005 can store setting values, for example, relating to paper type 1006 and printing quality 1007. Similarly, the reverse face settings 1008 can store setting values, for example, relating to paper type 1009 and printing quality 1010.

On the other hand, when the setting value of two-sided print 1012 is "automatic two-sided print OFF," the printer driver 204 writes setting values into the one-sided printing section 1001 that stores setting items identical to those of the front face settings 1005 and the reverse face settings 1008 (i.e., paper type 1002 and printing quality 1003, according to the present exemplary embodiment).

Then, the printer driver 204 can send, to the application 201, setting values and calculation values relating to the print setting object, based on the use of extended DDI. With the above processing, in the same size creation processing of step S609 shown in FIG. 6, the printer driver 204 can send, to the application 201, the layout information including the reduction rate changeable in the page-by-page basis.

As described above, according to present exemplary embodiment, in an information processing apparatus that can change an enlargement rate in units of job under the control of the operating system, the printer driver can produce print data so as to change the print settings including, formation of margin and same size printing, on the page-by-page basis. The printing apparatus can selectively apply the borderless printing to each page so that a user can obtain a desired print result.

According to the present exemplary embodiment, the processing of FIGS. 5 and 6 can be performed by the printer driver. However, a host computer or a server computer can execute the processing of FIGS. 5 and 6 if program codes for the processing can be installed from an external device. In this case, the program and related information can be supplied from an external storage medium to an output apparatus via a recording medium (e.g., CD-ROM, flash memory, or FD) or a network.

As described above, the software program codes realizing the above-described functions of the present exemplary embodiments can be supplied via a storage medium to a system or an apparatus. A computer (or CPU or MPU) of the system or the apparatus can read and execute the supplied program codes to realize the functions of the present exemplary embodiments.

In this case, the equivalents of programs can be used if they possess comparable functions. Accordingly, when the functions or processes of the present invention are realized by a computer, program codes installed in the computer and a recording medium storing the programs are also means for realizing the present invention.

In other words, the present invention encompasses the computer programs that can realize the functions or processes of the present invention or any recording medium that can store the program(s). In this case, any types of program(s) can be selected, for example, object codes, interpreter programs, and OS script data.

A recording medium supplying the program(s) can be selected from any one of flexible disk, hard disk, optical disk, magneto-optical disk, MO, CD-ROM, CD-R, CD-RW, magnetic tape, nonvolatile memory card, ROM, and DVD (DVD-ROM, DVD-R).

In this case, the program codes read out from the storage medium can realize the functions of the above-described exemplary embodiments. The storage medium storing the program codes can realize the present invention.

The method for supplying the program(s) includes accessing a home page on the Internet using the browsing function of a client computer, when the home page allows each user to download the computer programs of the present invention, or compressed files of the programs having automatic installing functions, to a hard disk or other recording medium of the user.

Furthermore, the program codes constituting the programs of the present invention can be divided into a plurality of files so that respective files are downloadable from different home pages. Namely, the present invention encompasses WWW servers or ftp servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers.

When the computer reads and executes the installed programs, the functions of the above-described exemplary embodiments can be realized. Furthermore, based on an instruction of the program, the operating system running on the computer may execute part or all of the processing so that the functions of the above-described exemplary embodiments can be realized.

Furthermore, the program codes read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described exemplary embodiments can be realized.

The present invention is not intended to limited to the above-described exemplary embodiments and can be modified in various ways (including any combination of the exemplary embodiments) within the scope of the present invention.

According to the present invention, even in an information processing apparatus that can change an enlargement rate in units of job under the control of the operating system, information processing apparatus can produce print data so as to change print settings on the page-by-page basis. The printing apparatus can selectively apply the borderless printing to each page so that a user can obtain a desired print result.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-218726 filed Jul. 28, 2005, which is hereby incorporated by reference herein in its entirety.

What is claimed:

1. An information processing apparatus configured to be operated by a system incapable of changing an enlargement/reduction rate per page, the information processing apparatus comprising:
   a first designation unit configured to designate whether to perform borderless printing;
   a second designation unit configured to designate whether to perform two-sided printing;
   a third designation unit configured to designate whether to print a border on a front face when two-sided printing is performed;
   an instruction unit configured to instruct an enlargement rate to the system, in a case where the first designation unit designates borderless printing, wherein the system enlarges drawing data based on the instructed enlargement rate and generates raster data;
   a first producing unit configured to create a margin on the raster data enlarged and generated by the system and to produce bordered printing data, in a case where the second designation unit designates two-sided printing and the third designation unit designates bordered printing on a front face; and
   a second producing unit configured to produce borderless printing data based on the raster data enlarged and generated by the system, in a case where the second designation unit designates two-sided printing and the third designation unit does not designate bordered printing on a front face.

2. The information processing apparatus according to claim 1, further comprising:
   a fourth designation unit configured to designate whether to print the front face in a same size when two-sided printing is performed; and
   a return unit configured to calculate a reciprocal of the enlargement rate and to return the calculated reciprocal to an application,
   wherein the application reduces a paper size and produces drawing data, and
   wherein the system enlarges the drawing data based on the instructed enlargement rate and produces raster data.

3. A method for controlling an information processing apparatus configured to be operated by a system incapable of changing an enlargement/reduction rate per page, the method comprising:
   via a first designation unit, designating whether to perform borderless printing;
   via a second designation unit, designating whether to perform two-sided printing;
   via a third designation unit, designating whether to print a border on a front face when two-sided printing is performed;
   via an instruction unit, instructing an enlargement rate to the system, in a case where the first designation unit designates borderless printing, wherein the system enlarges drawing data based on the instructed enlargement rate and generates raster data;
   via a first producing unit, creating a margin on the raster data enlarged and generated by the system and to produce bordered printing data, in a case where the second designation unit designates two-sided printing and the third designation unit designates bordered printing on a front face; and via a second producing unit, producing borderless printing data based on the raster data enlarged and generated by the system, in a case where the second designation unit designates two-sided printing and the third designation unit does not designate bordered printing on a front face.

4. The method for controlling an information processing apparatus according to claim 3, further comprising:

via a fourth designation unit, designating whether to print the front face in a same size when two-sided printing is performed; and via a return unit, calculating a reciprocal of the enlargement rate and to return the calculated reciprocal to an application, wherein the application reduces a paper size and produces drawing data, and wherein the system enlarges the drawing data based on the instructed enlargement rate and produces raster data.

5. A non-transitory computer readable storage medium containing computer-executable instructions for controlling a processor in an information processing apparatus configured to be operated by a system incapable of changing an enlargement/reduction rate per page, the medium comprising:

computer-executable instructions that designate whether to perform borderless printing;

computer-executable instructions that designate whether to perform two-sided printing;

computer-executable instructions that designate whether to print a border on a front face when two-sided printing is performed;

computer-executable instructions that designate an enlargement rate to the system, in a case where borderless printing is designated, wherein the system enlarges drawing data based on the instructed enlargement rate and generates raster data;

computer-executable instructions that create a margin on the raster data enlarged and generated by the system and to produce bordered printing data, in a case where two-sided printing is designated and bordered printing is designated on a front face; and computer-executable instructions that produce borderless printing data based on the raster data enlarged and generated by the system, in a case where two-sided printing is designated and bordered printing on a front face is not designated.

6. The non-transitory computer readable storage medium according to claim 5, further comprising:

computer-executable instructions that designate whether to print the front face in a same size when two-sided printing is performed; and computer-executable instructions that calculate a reciprocal of the enlargement rate and to return the calculated reciprocal to an application, wherein the application reduces a paper size and produces drawing data, and wherein the system enlarges the drawing data based on the instructed enlargement rate and produces raster data.

* * * * *